(12) United States Patent
Sasaki et al.

(10) Patent No.: US 7,742,371 B2
(45) Date of Patent: Jun. 22, 2010

(54) INFORMATION RECORDING/REPRODUCING DEVICE, INFORMATION RECORDING/REPRODUCING METHOD, AND INFORMATION RECORDING/REPRODUCING PROGRAM

(75) Inventors: Yoshio Sasaki, Saitama (JP); Yasuhiko Tominaga, Saitama (JP); Yoshiharu Suzuki, Saitama (JP)

(73) Assignee: Pioneer Corporation, Tokyo (JP)

( * ) Notice: Subject to any disclaimer, the term of this patent is extended or adjusted under 35 U.S.C. 154(b) by 794 days.

(21) Appl. No.: 10/577,524

(22) PCT Filed: Sep. 24, 2004

(86) PCT No.: PCT/JP2004/013955

§ 371 (c)(1),
(2), (4) Date: Jun. 28, 2006

(87) PCT Pub. No.: WO2005/043521

PCT Pub. Date: May 12, 2005

(65) Prior Publication Data

US 2008/0279058 A1 Nov. 13, 2008

(30) Foreign Application Priority Data

Oct. 31, 2003 (JP) .............................. 2003-373748

(51) Int. Cl.
*G11B 7/004* (2006.01)

(52) U.S. Cl. .................................................. 369/47.51

(58) Field of Classification Search .............. 369/44.27, 369/47.5, 47.52, 124.04, 292
See application file for complete search history.

(56) References Cited

U.S. PATENT DOCUMENTS 6,421,314 B1 * 7/2002 Maruyama .................. 369/116
7,038,989 B2 * 5/2006 Asada et al. ............. 369/59.11

FOREIGN PATENT DOCUMENTS

| JP | 10-65240 | 3/1998 |
| JP | 2000-149302 | 5/2000 |
| JP | 2001-56953 | 2/2001 |

* cited by examiner

*Primary Examiner*—Wayne R Young
*Assistant Examiner*—Brian Butcher
(74) *Attorney, Agent, or Firm*—Young & Thompson

(57) ABSTRACT

It is possible to obtain preferable recording characteristic and reproduction characteristic by considering irregularities of unique characteristics of an LD or the like mounted on an information recording and reproduction apparatus as well as characteristics of an optical disc used. In the information recording and reproduction apparatus, a light source such as a laser diode is driven by a laser drive signal so that a laser beam for recording or reproduction is emitted from the light source. Moreover, the laser drive signal is superimposed by a high-frequency signal of a predetermined frequency so as to eliminate effect of the return light from the optical disc. The information recording and reproduction apparatus superimposes the high-frequency signal by using a high-frequency signal level during recording which is different from a high-frequency signal level during reproduction.

5 Claims, 7 Drawing Sheets

WRITE POWER Pw

ERASE POWER Pe

BIAS POWER Pb

WRITE POWER Pw

ERASE POWER Pe

BIAS POWER Pb

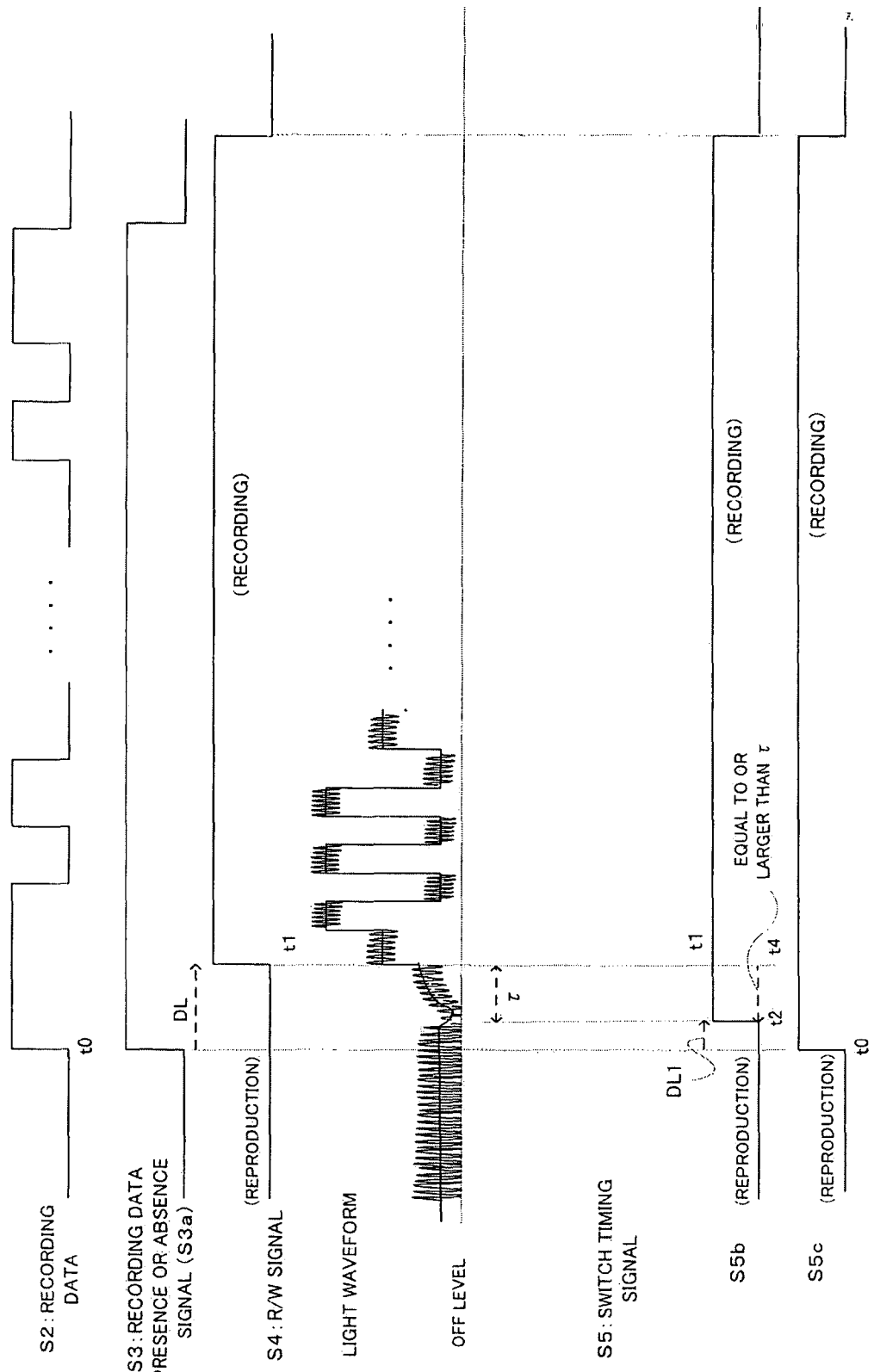

INFORMATION RECORDING/REPRODUCING DEVICE, INFORMATION RECORDING/REPRODUCING METHOD, AND INFORMATION RECORDING/REPRODUCING PROGRAM

TECHNICAL FIELD

The present invention relates to an information recording and reproduction apparatus, an information recording and reproduction method and a program thereof, which record and reproduce information onto and from a recording medium by irradiating a laser light and the like.

BACKGROUND TECHNIQUE

Onto a recordable or rewritable optical disc such as a DVD-R (DVD-Recordable) or a DVD-RW (DVD-Re-Recordable), information is recorded thereon and the recorded information is reproduced by irradiating a laser beam on its recording surface. A power of the laser light irradiated onto the optical disc is controlled based on a recording pulse waveform corresponding to data to be recorded at the time of recording the information, and is maintained to a predetermined reproduction power at the time of reproduction. Specifically, by supplying a current corresponding to a power of a recording pulse waveform and a reproduction power to a light source such as a laser diode (LD), a recording laser light or a reproduction laser light is generated. There is known a method of superimposing a high frequency signal on the current supplied to the laser diode in order to reduce an effect of a return light of the irradiated laser light from the optical disc at this time. The level of the superimposed high frequency signal is same at the time of the recording and the reproduction of the information.

However, in the method of superimposing the high frequency signal having the same level at the time of the recording and the reproduction, by difference of characteristics of the LD and the like loaded on the information recording and reproduction apparatus and difference of characteristics of used optical discs, preferred recording characteristic and reproduction characteristic may be incompatible.

DISCLOSURE OF INVENTION

The present invention has been achieved in order to solve the above problems. It is an object of this invention to provide an information recording and reproduction apparatus, an information recording and reproduction method and a program thereof, capable of obtaining preferred recording characteristic and reproduction characteristic by considering the difference of characteristics of an LD and the like loaded on the information recording and reproduction apparatus and the difference of characteristics of used optical discs.

According to one aspect of the present invention, there is provided an information recording and reproduction apparatus which records and reproduces information by irradiating a laser light onto a recording medium, including: a light source which emits the laser light; a driving signal generating unit which generates a laser driving signal having a recording power level corresponding to recording data or a reproduction power level; a high frequency superimposing unit which superimposes a high frequency signal on the laser driving signal; and a control unit which drives the light source by the laser driving signal on which the high frequency signal is superimposed to perform recording and reproduction, wherein a level of the high frequency signal at a time of recording is different from the level of the high frequency signal at a time of reproduction.

The above information recording and reproduction apparatus records and reproduces the information onto the recording medium such as a DVD□}RW. As the light source of the laser light, the laser diode is used for example. The laser driving signal having the recording power level corresponding to the recording data inputted from the outer portion or the reproduction power level is generated by the generating unit of a write strategy, for example. By driving the light source such as the laser diode by the laser driving signal, the laser light for the recording or the reproduction is emitted from the light source. In addition, the high frequency signal of a predetermined frequency is superimposed on the laser driving signal in order to remove the effect of the return light from the optical disc.

Depending on the characteristic of the used optical disc and the characteristic of the laser diode used for the information recording and reproduction apparatus as the light source, the level of the high frequency signal necessary to obtain an optimum recording characteristic is not always same as the level of the high frequency signal necessary to obtain an optimum reproduction characteristic. Therefore, by the information recording and reproduction apparatus, the superimposing level of the high frequency signal at the time of the recording is made different from the superimposing level of the high frequency signal at the time of the reproduction. Thereby, it becomes possible to realize the optimum recording characteristic and the optimum reproduction characteristic at the same time. In addition, by high recording sensitivity, the information recording and reproduction apparatus is suitable for high-speed recording.

In the above information recording and reproduction apparatus, it is preferable that the level of the high frequency signal at the time of the recording is smaller than the level of the high frequency signal at the time of the reproduction. Generally, it is known that the level of the high frequency signal necessary to obtain a preferred recording characteristic is smaller than the level of the high frequency signal necessary to obtain a preferred reproduction characteristic. Therefore, by making the level of the high frequency signal at the time of the recording smaller than the level of the high frequency signal at the time of the reproduction, it becomes possible that the recording characteristic and the reproduction characteristic are compatible.

In a preferred example, the level of the high frequency signal at the time of the reproduction may be equal to or larger than 5 mWpp when the recording medium is a DVD, and the level of the high frequency signal at the time of the recording may be equal to or smaller than 4 mWpp when the recording medium is a DVD□}R/RW.

In the above information recording and reproduction apparatus, it is preferable that the high frequency superimposing unit changes the level of the high frequency signal at a timing a predetermined time period before the transition of the control unit from a reproduction state to a recording state. In this case, it is preferable that the predetermined time period is longer than a time period necessary for a transient response of a waveform of the laser light by change of the level of the high frequency signal to stabilize. Thereby, it can be prevented that the recording characteristic and the like are affected due to the transient response of the light waveform.

According to another aspect of the present invention, there is provided an information recording and reproduction method which records and reproduces information by irradiating a laser light onto a recording medium, including: a driving signal generating process which generates a laser driving signal having a recording power level corresponding to recording data or a reproduction power level; a high frequency superimposing process which superimposes a high frequency signal on the laser driving signal; and a control process which drives a light source by the laser driving signal on which the high frequency signal is superimposed to perform recording and reproduction, wherein a level of the high frequency signal at a time of recording is different from the level of the high frequency signal at a time of reproduction.

According to still another aspect of the present invention, there is provided a computer-readable medium with an information recording and reproduction program which is executed in an information recording and reproduction apparatus recording and reproducing information by irradiating a laser light onto a recording medium, making the information recording and reproduction apparatus function as: a driving signal generating unit which generates a laser driving signal having a recording power level corresponding to recording data or a reproduction power level; a high frequency superimposing unit which superimposes a high frequency signal on the laser driving signal; and a control unit which drives a light source by the laser driving signal on which the high frequency signal is superimposed to perform recording and reproduction, wherein a level of the high frequency signal at a time of recording is different from the level of the high frequency signal at a time of reproduction.

By the information recording and reproduction method and the information recording and reproduction program, the preferred recording characteristic and the preferred reproduction characteristic can be compatible, similarly to the above-mentioned information recording and reproduction apparatus.

BRIEF DESCRIPTION OF THE DRAWINGS

FIG. 8 shows an example of the waveform of each unit shown in FIG. 4, particularly another example of the switch timing signal.

BRIEF DESCRIPTION OF THE REFERENCE NUMBER

Figure 1:
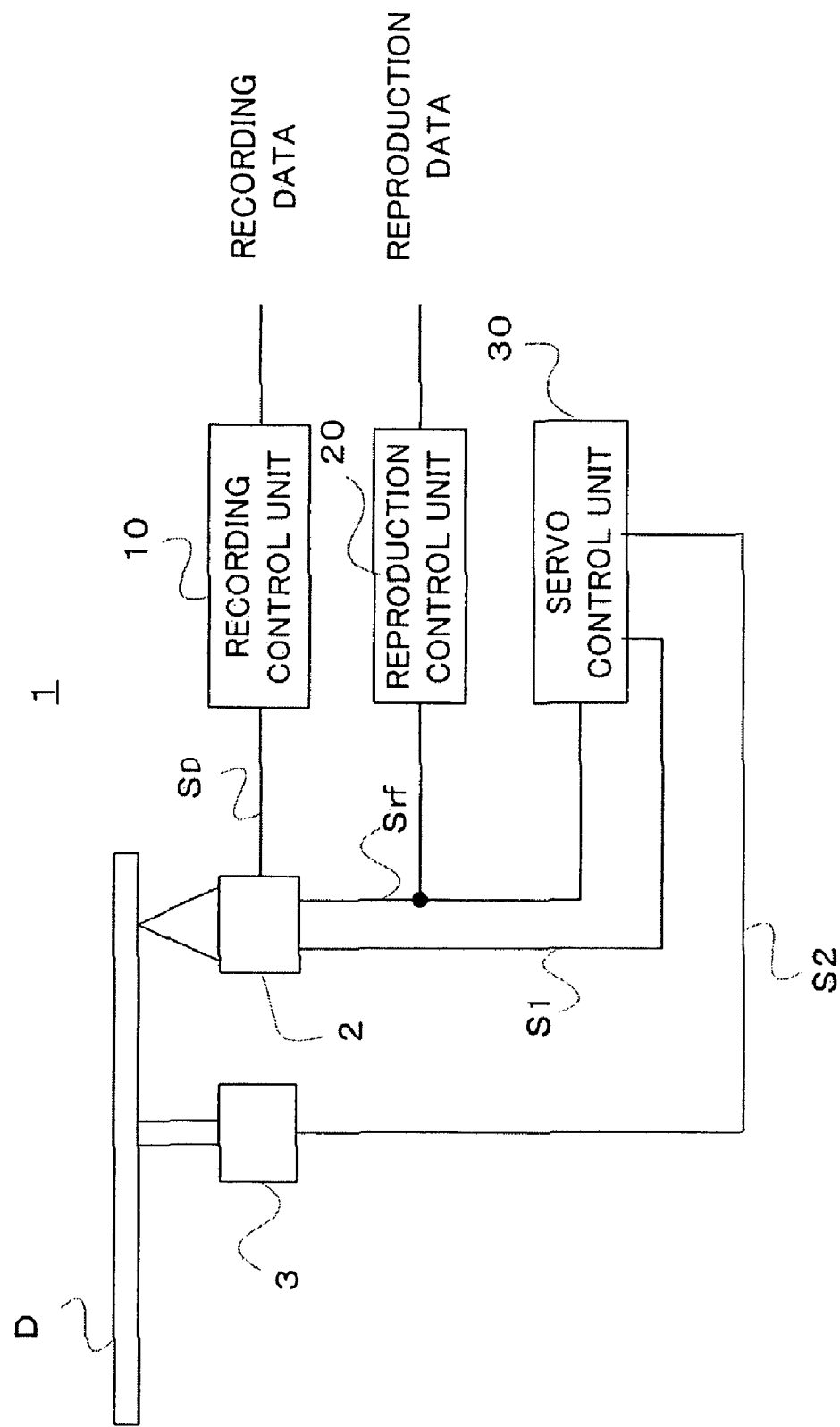
FIG. 1 is a block diagram schematically showing an information recording and reproduction apparatus to which the present invention is applied.

1 Information recording and reproduction apparatus
10 Recording control unit
20 Reproduction control unit
30 Servo control unit
41 Recording data generating unit
42 Write strategy generating unit
43 Switch timing signal generating unit
44 High frequency superimposing unit
45 Recording power determination unit
46 Reproduction power determination unit
47 to 49 LD drivers

DETAILED DESCRIPTION OF THE PREFERRED EMBODIMENTS

The preferred embodiments of the present invention will now be described below with reference to the attached drawings.

FIG. 1 schematically shows the whole configuration of the information recording and reproduction apparatus according to the embodiment of the present invention. An information recording and reproduction apparatus 1 records information on an optical disc D, and reproduces the information from the optical disc D. As the optical disc D, for example, a DVD-RW capable of erasing and recording the information a plurality of times may be used.

The information recording and reproduction apparatus 1 includes an optical pickup 2 which irradiates a recording beam and a reproduction beam on the optical disc D, a spindle motor 3 which controls rotation of the optical disc D, a recording control unit 10 which controls the recording of the information on the optical disc D, a reproduction control unit 20 which controls reproduction of the information already recorded on the optical disc D, and a servo control unit 30 which executes various kinds of servo control including a spindle servo which controls rotation of the spindle motor 3, and a focus servo and a tracking servo, both of width are relative position control of the optical pickup 2 to the optical disc D.

The recording control unit 10 receives the recording data and generates a driving signal SD for driving a laser diode inside the optical pickup 2 by a process described below, and supplies the signal SD to the optical pickup 2.

The reproduction control unit 20 receives a read-out RF signal Srf which is outputted from the optical pickup 2, and generates and outputs a reproduction signal by executing a predetermined demodulating process and decoding process to the signal Srf.

The servo control unit 30 receives the read-out RF signal Srf from the optical pickup 2, and supplies, to the optical pickup 2, a servo signal S1 such as a tracking error signal and a focus signal based on the signal, and also supplies a spindle servo signal S2 to the spindle motor 3. Thus, various kinds of servo processes, such as a tracking servo, a focus servo and a spindle servo, are executed.

The present invention mainly relates to a method of the recording in the recording control unit 10, and various kinds of known methods can be applied, as to the reproduction control and the servo control. Therefore, an explanation thereof is not given in detail here.

Figure 2:
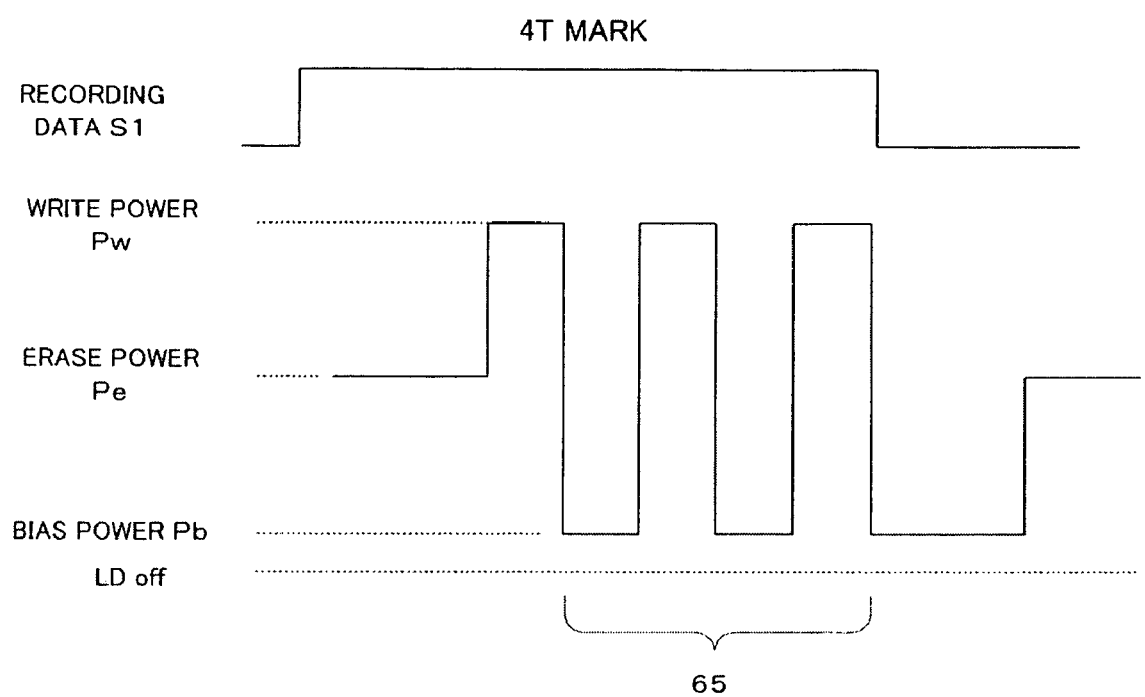
FIG. 2 schematically shows an example of a light waveform during recording in a case that a DVD□}RW is used as an optical disc.

Next, the description will be given of the light waveform of the above-mentioned information recording and reproduction apparatus. FIG. 2 schematically shows an example of the light waveform during the recording in a case that the DVD□}RW is used as the optical disc. This example shows the light waveform during the recording in a case that the recording data is 4T mark. This light waveform is emitted from the light source by driving the light source such as the laser diode with the recording pulse signal corresponding to the light waveform shown in FIG. 2.

As shown in FIG. 2, the light waveform has three values, i.e., a write power Pw, an erase power Pe and a bias power Pb, each of which has a predetermined level with respect to the level LDoff at the time of the laser off. The write power Pw is for performing the recording (recording the information) onto the optical disc, and the erase power Pe is for erasing the recording mark recorded onto the optical disc. In addition, the bias power Pb is for performing neither recording nor erasing on the optical disc. Namely, at the time of the recording, the recording mark formed on the optical disc is erased with the erase power Pe, and by alternately switching and giving the write power Pw and the bias power Pb, the recording mark having a predetermined length is recorded onto the optical disc. As the recording mark becomes longer, a number of repeating in a repeating portion 65 between the write power Pw and the bias power Pb increases.

On the other hand, at the time of the reproduction, the level of the light waveform is basically maintained to the read power. In this embodiment, the bias power Pb coincides with the read power. At the time of the reproduction, the recording and erasing onto and from the optical disc are not performed, and based on the return light amount from the optical disc, the reproduction of the recording data is performed.

Figure 3A:
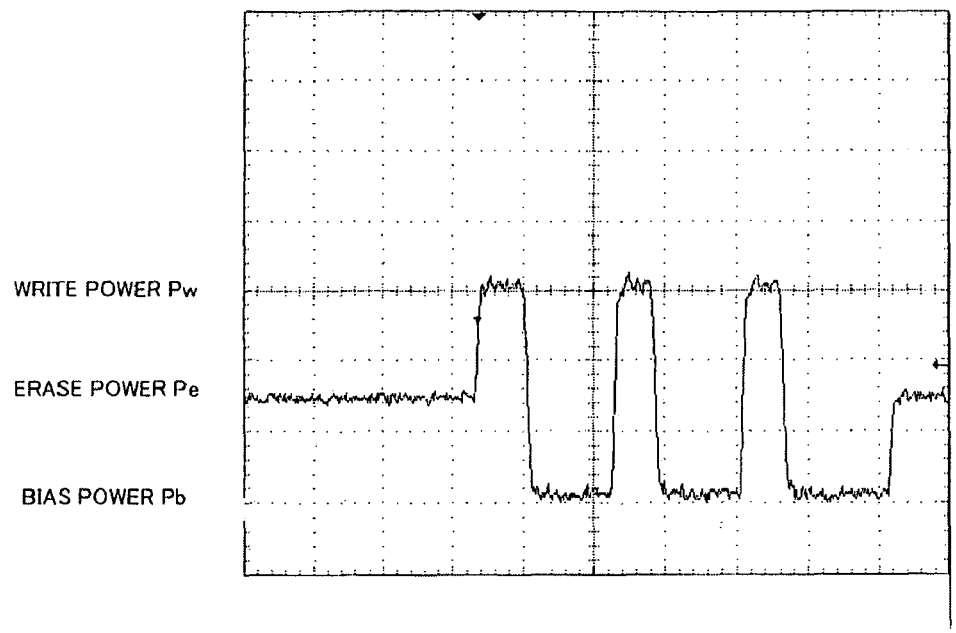
FIG. 3A shows an example of an actual recording waveform in a case that a high frequency is not superimposed.
Figure 3B:
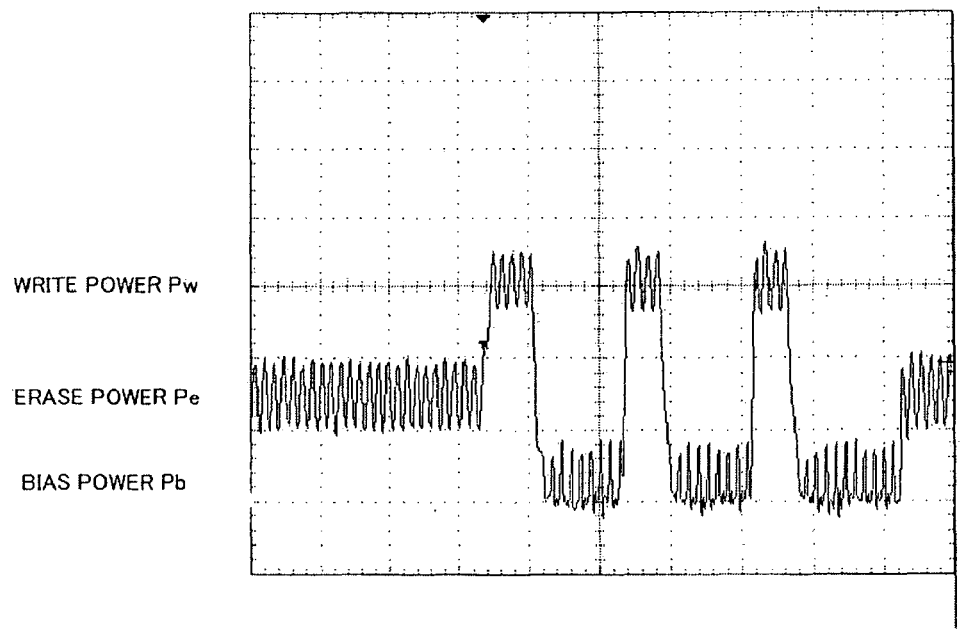
FIG. 3B shows an example of an actual recording waveform in a case that the high frequency is superimposed.

FIGS. 3A and 3B show examples of the actual light waveform. The examples shown in FIGS. 3A and 3B are examples of the recording data of 4T, similarly to FIG. 2. FIG. 3A shows the waveform in a case that the high frequency is not superimposed, and shows the example of the actual waveform corresponding to the light waveform shown in FIG. 2. FIG. 3B shows the waveform in a case that the high frequency is superimposed. In the actual information recording and reproduction apparatus, as shown in FIG. 3B, the high frequency is superimposed on the light waveform so that the effect of the return light from the optical disc is reduced. At the time of the recording and the reproduction, the high frequency is superimposed. The frequency of the high frequency is about 350 MHz, for example. The present invention is basically characterized in that the level of the high frequency superimposed on the light waveform is made different at the time of the recording and the reproduction, which will be explained in detail below.

Figure 4:
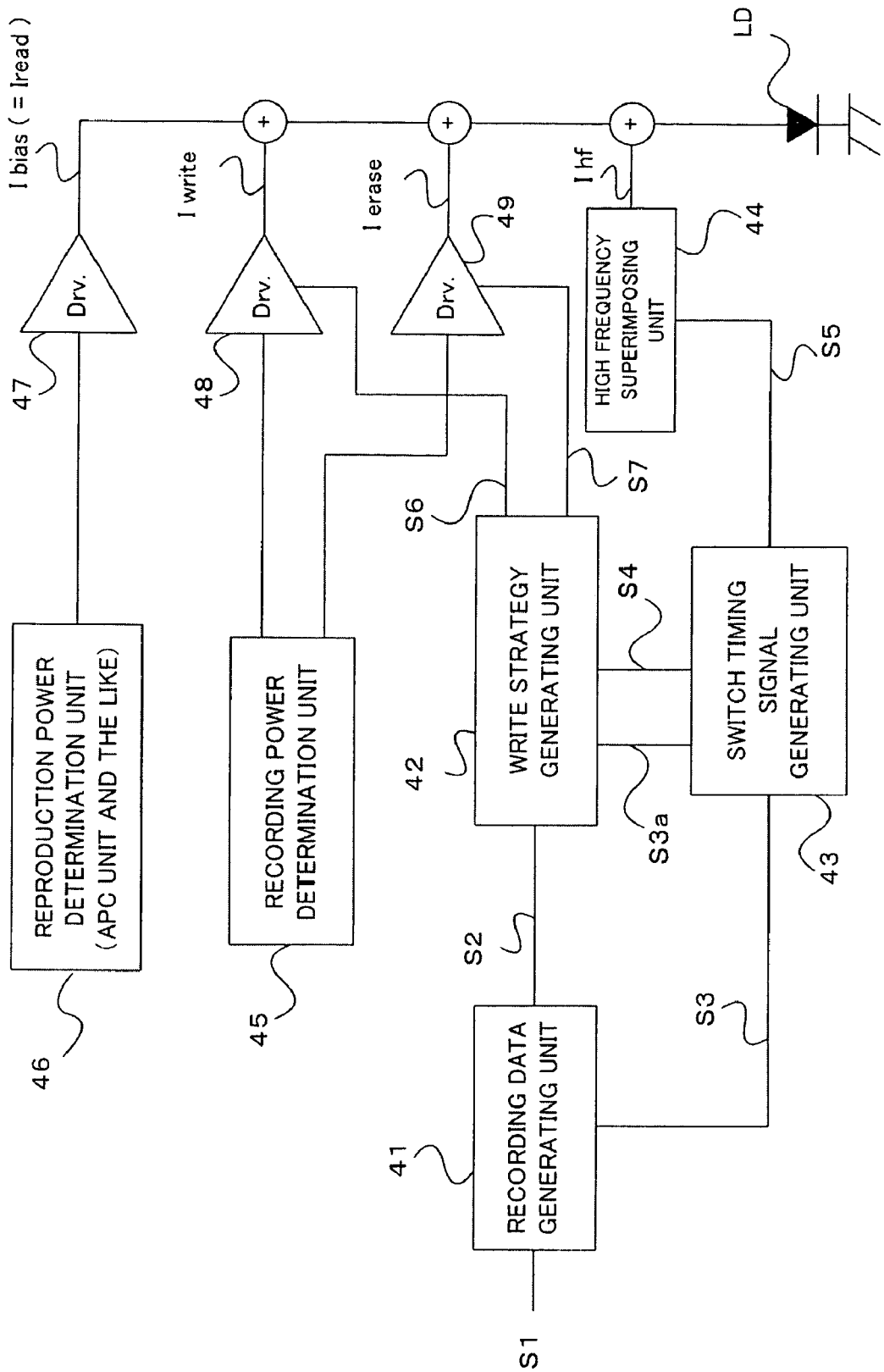
FIG. 4 is a block diagram of a recording and reproduction control unit of the information recording and reproduction apparatus to which the present invention is applied.
Figure 7:
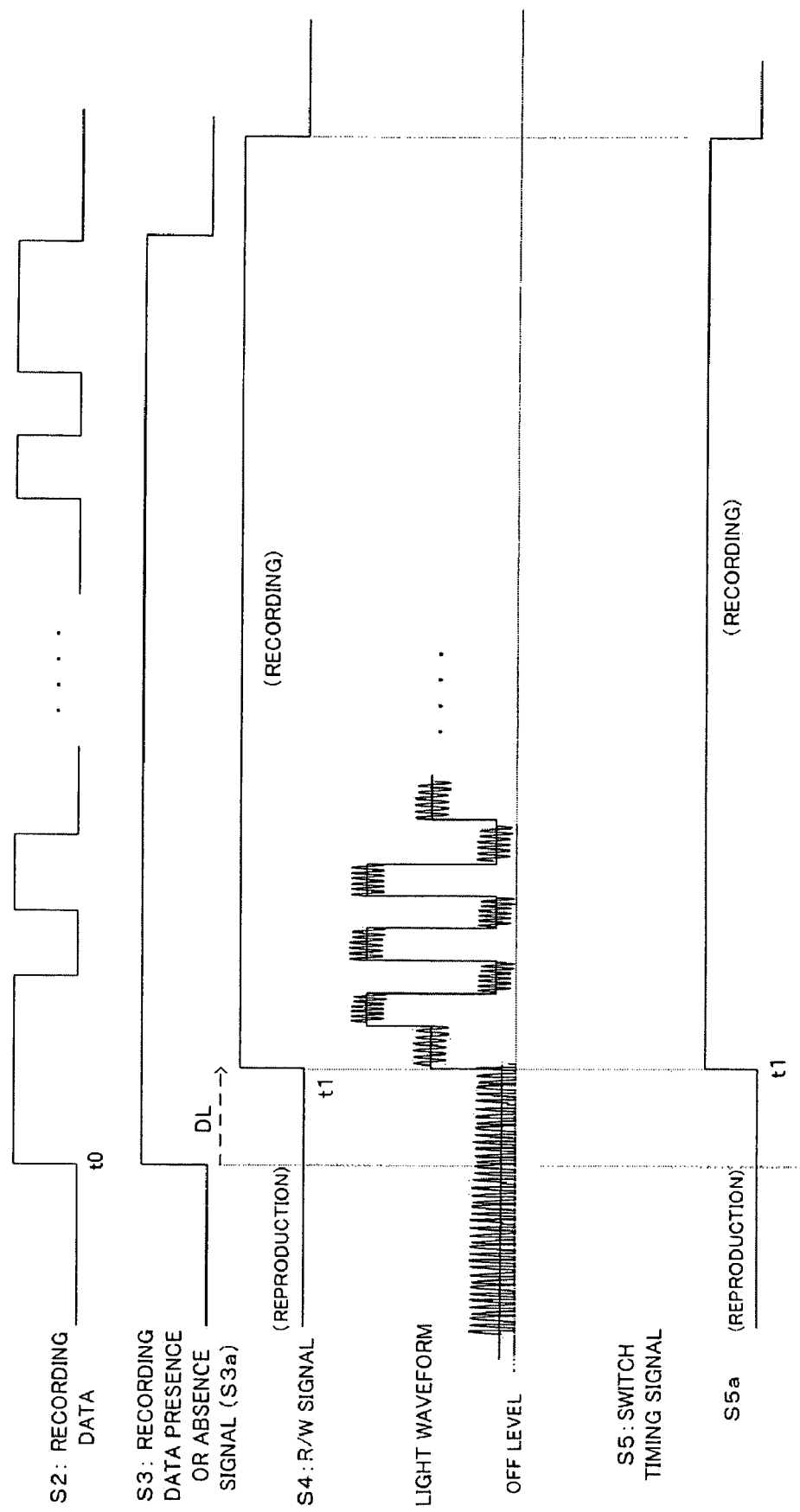
FIG. 7 shows an example of a waveform of each unit shown in FIG. 4, particularly an example of a switch timing signal.

Next, the description will be given of recording and reproduction control in the information recording and reproduction apparatus of the present invention. FIG. 4 is a block diagram of the recording and reproduction control unit of the information recording and reproduction apparatus to which the present invention is applied. In addition, FIG. 7 shows an example of the signal waveform of each unit shown in FIG. 4. It is noted that the recording and reproduction control unit shown in FIG. 4 is configured by a part of the recording control unit 10 and a part of the reproduction control unit 20 shown in FIG. 1.

As shown in FIG. 4, the recording and reproduction control unit includes a recording data generating unit 41, a write strategy generating unit 42, a switch timing signal generating unit 43, a high frequency superimposing unit 44, a recording power determination unit 45, a reproduction power determination unit 46, LD drivers 47 to 49 and a laser diode LD.

The recording data generating unit 41 receives recording information S1 inputted from the outside of the information recording and reproduction apparatus, and generates recording data S2 and a recording data presence or absence signal S3. As shown in FIG. 7, the recording data S2 is the pulse waveform showing the data corresponding to the recording information S1, and the length of the pulse corresponds to the recording information. Specifically, the recording data generating unit 41 executes 8-16 modulation to the inputted recording information, and generates the recording data S2 having a mark and a space with any one of lengths 3T to 11T and 14T. The recording data presence or absence signal S3 is a pulse signal generated based on the recording information S1 and showing a period in which the recording data exists. In the example in FIG. 7, the recording data presence or absence signal S3 reaches a high (H) level in a period that the recording data S2 exists, and falls to a low (L) level in a period that the recording data S2 does not exist.

The write strategy generating unit 42 receives the recording data S2, and generates the recording pulse waveform (like the pulse waveform shown in FIG. 2 for example, and also referred to as "write strategy") corresponding to the recording mark with each length. Then, the write strategy generating unit 42 generates control signals S6 and S7 based on the generated recording pulse waveform, and executes On/Off-control to each of LD drivers 48 and 49.

Additionally, the write strategy generating unit 42 generates not only the write strategy but also a Read/Write (R/W) signal S4 showing whether the data is actually being recorded or reproduced, and supplies it to the switch timing signal generating unit 43. As shown in FIG. 7, the R/W signal S4 has a predetermined delay DL with respect to the recording data presence or absence signal S3. The delay DL corresponds to a processing time period necessary for the write strategy generating unit 42 to generate the write strategy based on the recording data S2 inputted from the recording data generating unit 41.

The recording power determination unit 45 determines the write power Pw and the erase power Pe, and the reproduction power determination unit 46 determines the bias power Pb. The reproduction power control unit 46 includes an APC (Automatic Power Control) circuit, and the APC circuit executes the gain control so that the bias power Pb is always at the constant level at the time of the reproduction. The reproduction power determination unit 46 controls the LD driver 47 based on the determined bias power Pb, and drives the laser diode LD with the driving current Ibias (=Iread) corresponding to the bias power Pb. Thereby, the laser diode LD emits the light with the bias power Pb.

The recording power determination unit 45 determines the write power Pw and the erase power Pe, and controls the LD drivers 48 and 49 based on them. The LD drivers 48 and 49 supply, to the laser diode LD, the driving current Iwrite corresponding to the write power and the driving current Ierase corresponding to the erase power, respectively. The write strategy generating unit 42 executes the On/Off-control to the LD drivers 48 and 49. Therefore, by the control of the write strategy generating unit 42, the laser diode LD emits the light at any one of three levels, i.e., the write power Pw, the erase power Pe and the bias power Pb.

Specifically, when the write strategy generating unit 42 turns off the LD drivers 48 and 49, only the driving current Ibias (=Iread) is supplied to the laser diode LD, and the light waveform becomes the bias power Pb. When the write strategy generating unit 42 turns off the LD driver 48 and turns on the LD driver 49, the driving current (Iread+Ierase) is supplied to the laser diode LD, and the light waveform becomes the erase power Pe. In addition, when the write strategy generating unit 42 turns on the LD driver 48 and turns off the LD driver 49, the driving current (Iread+Iwrite) is supplied to the laser diode LD, and the light waveform becomes the write power Pw. In the way, the level of the light waveform at the time of the recording and the reproduction is controlled.

The high frequency superimposing unit 44 adds a high frequency current Ihf to the driving current supplied to the laser diode LD, and superimposes the high frequency on the light waveform as shown in FIG. 3B. The high frequency superimposing unit 44 switches the high frequency superimposing level at the time of the recording and the high frequency superimposing level at the time of the reproduction in accordance with the switch timing signal S5 supplied from the switch timing signal generating unit 43.

Figure 5:
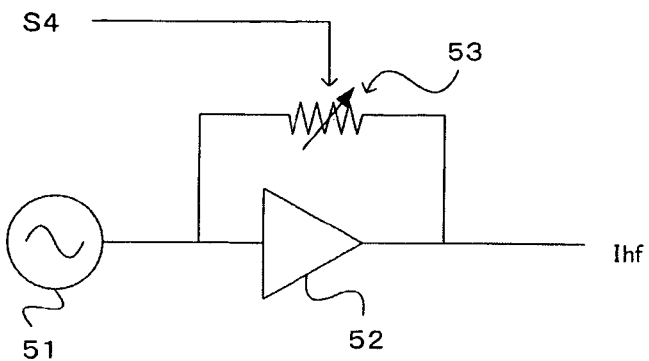
FIG. 5 shows an example of an internal configuration of a high frequency superimposing unit shown in FIG. 4.

FIG. 5 shows an example of the internal configuration of the high frequency superimposing unit 44. The high frequency superimposing unit 44 includes a high frequency oscillator 51, an amplifier 52 and a variable resistance 53. The high frequency oscillator 51 generates the high frequency with the predetermined frequency, e.g., about 350 MHz. The amplifier 52 outputs the high frequency current Ihf with an amplifying degree corresponding to the residence value of the variable residence 53. FIG. 7 and FIG. 8 show examples of the switch timing signal S5, and the level at the time of the recording is set higher than the level at the time of the reproduction. In this way, the high frequency superimposing unit 44 superimposes, on the light waveform, the high frequency at the level corresponding to the level of the switch timing signal S5. The high frequency superimposing level at the time of the recording and the reproduction will be explained later.

The switch timing signal generating unit 43 generates the switch timing signal S5 on the basis of the recording data presence or absence signal S3 supplied from the recording data generating unit 41 and the R/W signal S4 supplied from the write strategy generating unit 42 to supply it to the high frequency superimposing unit 44. Therefore, the switch timing signal generating unit 43 controls the superimposing level and the superimposing timing of the high frequency at the time of the recording and the reproduction.

Figure 6:
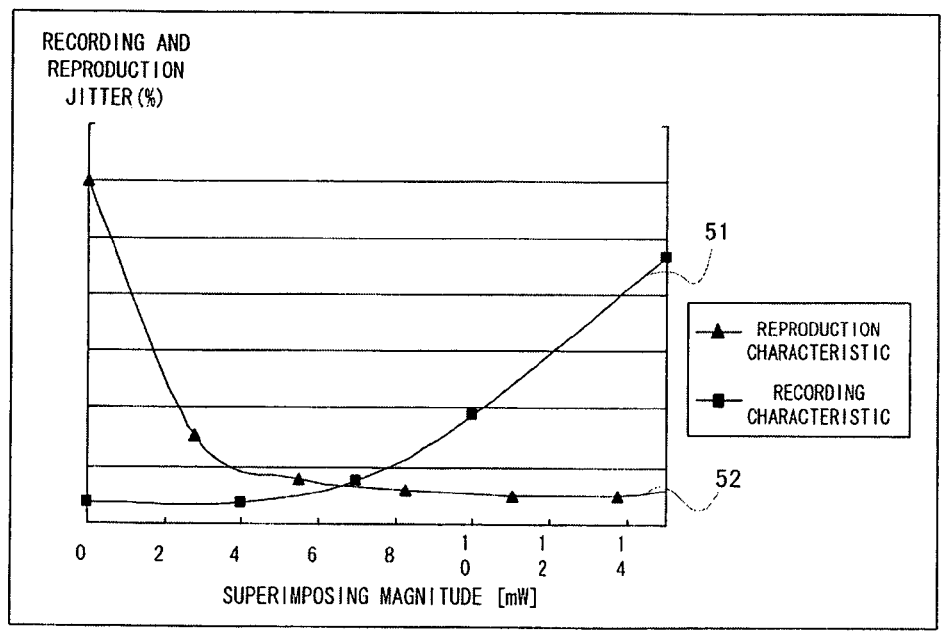
FIG. 6 shows a recording characteristic and a reproduction characteristic in a case that a high frequency superimposing level is varied.

Next, the description will be given of the high frequency superimposing level at the time of the recording and the reproduction. FIG. 6 shows the recording characteristic and the reproduction characteristic in a case that the high frequency superimposing level is varied, specifically a characteristic of recording and reproduction jitter. The horizontal axis shows the high frequency superimposing level (magnitude), and the vertical axis shows the recording and reproduction jitter. A reproduction characteristic 52 shows the reproduction jitter amount in a case that the recording signal is reproduced in a certain DVD-RW drive apparatus with varying the high frequency superimposing level. A recording characteristic 51 shows the reproduction jitter in a case that the data is recorded with varying the high frequency superimposing level and the recording data is reproduced in the same drive apparatus, which shows recording quality.

As understood from each characteristic, as for the recording characteristic 51, when the high frequency superimposing level becomes large, the jitter increases and the characteristic worsens. In the example of FIG. 6, it is preferable that the high frequency superimposing level at the time of the recording is smaller than 4 mW. When the high frequency superimposing level at the time of the recording is decreased to around 0, the effect by the high frequency superimposition cannot be obtained. Therefore, in this example, it is understood that the preferred high frequency superimposing level at the time of the recording is about 2 mW to 4 mW.

On the other hand, as for the reproduction characteristic 52, when the high frequency superimposing level becomes small, the jitter increases and the characteristic worsens. In the example of FIG. 6, it is preferable that the high frequency superimposing level at the time of the reproduction is equal to or larger than 6 mW. When the high frequency superimposing level at the time of the reproduction is made too large, the level of the light waveform becomes close to the erase power Pe, and the recording data may be erased. Therefore, it becomes necessary to determine the high frequency superimposing level within the range in which the level of the light waveform is not close to the erase power Pe.

From the example of FIG. 6, it is understood that the preferred high frequency superimposing level is different at the time of the recording and the reproduction and it is impossible to obtain the preferred recording characteristic and reproduction characteristic with the same high frequency superimposing level at the same time. FIG. 6 shows the example of a certain DVD-RW and a certain drive apparatus, and the recording characteristic and the reproduction characteristic are varied by the characteristics of the used optical disc and drive apparatus (particularly, by the characteristic of the laser diode). However, if the high frequency superimposing level is individually set at the time of the recording and the reproduction to be switched and used in the information recording and reproduction apparatus, regardless of the individually different characteristics of the disc and the drive apparatus, it becomes possible to obtain the preferred recording characteristic and reproduction characteristic.

Next, the description will be given of the switch timing of the high frequency superimposing level by the switch timing signal S5. There are some methods of determining the switch timing of the high frequency superimposing level, which will be described below. The methods will be explained below, with reference to FIG. 7 and FIG. 8.

A first method is a method of switching the high frequency superimposing level by the R/W signal S4 showing whether the data is actually being recorded or reproduced. The switch timing signal in this case is indicated as S5a in FIG. 7. The switch timing signal S5a changes from the reproduction level to the recoding level at time t1, similarly to the R/W signal S4. This method can be used in the case where it is possible to immediately compensate for a difference (amount of excess and deficiency) of the high frequency superimposing levels at the time of the recording and the reproduction in switching the high frequency superimposing level by other process (e.g., increase and decrease of the bias power) and where the transient response of the light waveform does not exist or can be suppressed to such a degree that the recording characteristic is not affected. FIG. 7 schematically shows the light waveforms. When the transient response does not exist as described above, the high frequency superimposing level may be switched by the switch timing signal S5a having the same rise-up and fall-down as the R/W signal S4.

However, when the transient response period is long and the recording characteristic is affected as described above, it is necessary that first the high frequency superimposing level is switched and then the reproduction stat should be changed to the recording state after the light waveform becomes stable, i.e., after the transient response of the light waveform ends. In this case, a second method which will be explained below is used.

FIG. 8 shows a waveform diagram in a case that the light waveform has the transient response. As shown in FIG. 8, it is assumed that the light waveform has a transient response period fÑ. In order to remove the effect of the transient response to the recording characteristic, it is necessary that the transient response period fÑ have already ended by the time t1 being the switch timing from the reproduction to the recording, i.e., at the time of the rise-up of the R/W signal S4. Therefore, it is necessary that the high frequency superimposing level is switched before a time period equal to or larger than the time period corresponding to the transient response period fÑ (i.e., before a time t2) with respect to the rise-up time t1 of the R/W signal S4. The switch timing signal S5b shown in FIG. 8 shows the switch timing in this case. Namely, the switch timing signal S5b switches the high frequency signal level at the timing preceding the time period equal to or larger than the transient response period fÑ from the R/W signal S4 (i.e., before the time t2).

Specifically, the switch timing signal generating unit 43 determines the value of the delay DL1 to rise up at the timing preceding the time period equal to or larger than the transient response time period fÑ with respect to the rise-up of the R/W signal S4 (at or before the time t2 in FIG. 8), and generates the switch timing signal S5b which rises up at the timing after passing of the delay DL1 from the recording data presence or absence signal S3. The switch timing signal S5b has the same fall-down timing as the R/W signal S4, and the timing of the transition from the high frequency superimposing level at the time of the recording to the high frequency superimposing level at the time of the reproduction is the same as the switch timing from the recording to the reproduction of the R/W signal S4.

In this manner, if the switch timing of the high frequency superimposing level prescribed by the switch timing signal precedes the actual timing of the transition from the reproduction state to the recording state, which is prescribed by the R/W signal S4, by the time period equal to or larger than the transient response period fÑ, since the transient response period fÑ of the light waveform has ended by the rise-up time T1 of the R/W signal S4, the effect to the recording characteristic of the transient response can be removed.

In addition, instead of the second method, it is also possible to switch the high frequency superimposing level by the switch timing signal S5 at a rise-up time t0 of the recording data presence or absence signal S3. FIG. 8 shows the switch timing signal S5c in such a case. The switch timing signal S5c has the same fall-down timing as the R/W signal S4. In the method, since the transition from the actual reproduction state to the recording state is performed after the transient response of the light waveform ends, the effect of the transient response to the recording characteristic can be removed.

Actually, by considering characteristics of an used laser diode and a subjected optical disc, any one of the above-mentioned methods may be chosen and applied for each information recording and reproduction apparatus.

As described above, according to the present invention, since the high frequency superimposing level is switched at the time of the recording and the reproduction, the recording characteristic and the reproduction characteristic can be excellent at the same time.

In the above-mentioned embodiment, it is described that the recording data presence or absence signal S3 is generated by the recording data generating unit 41 to be supplied to the switch timing signal generating unit 43. Instead, the recording data presence or absence signal S3 may be generated by the write strategy generating unit 42. The recording data presence or absence signal S3 shows the presence or absence of the recording data S2, and is supplied from the recording data generating unit 41 to the write strategy generating unit 42. Therefore, the write strategy generating unit 42 can also generate the recording data presence or absence signal S3a based on the recording data S2 received from the recording data generating unit 41 to supply it to the switch timing signal generating unit 43.

In addition, in the above-mentioned embodiment, the DVD□}RW is illustrated as the optical disc. However, the present invention is also applicable to a recording and reproduction apparatus for an optical disc such as a DVD□}R, a Blu-ray disc, an AOD disc and the like.

INDUSTRIAL APPLICABILITY

The information recording and reproduction apparatus, the information recording and reproduction method and the information recording and reproduction program according to the present invention can be used for a DVD recorder and the like which perform the recording and reproduction of the optical disc with high density such as a DVD capable of recording, with high density, various kinds of information such as video, sound and data for consumer use or for business. In addition, they can be also used for the information recording and reproduction apparatus such as a drive apparatus capable of being loaded on or connected with various kinds of computers for consumer use or for business.

The invention claimed is:

1. An information recording and reproduction apparatus which records and reproduces information by irradiating a laser light onto a recording medium, comprising:
   a light source which emits the laser light;
   a driving signal generating unit which generates a laser driving signal having a write power level corresponding to performing recording an information onto the recording medium, an erase power level corresponding to performing erasing a recording mark recorded onto the recording medium, or, a read power level corresponding to neither recording nor erasing on the recording medium;
   a high frequency superimposing unit which superimposes a high frequency signal on the laser driving signal; and
   a control unit which drives the light source by the laser driving signal on which the high frequency signal is superimposed to perform recording and reproduction,
   wherein a level of the high frequency signal at a time of recording is different from the level of the high frequency signal at a time of reproduction,
   wherein the control unit detects a recording information based on an inputted information,
   wherein the high frequency superimposing unit changes the level of the high frequency signal at the timing of a first predefined time period after detecting the recording information,
   wherein the control unit transits from a reproduction state to a recording state by changing the power level from the read power level to the erase power level at the timing of a second predefined time period after detecting the recording information, and records the recording information onto the recording medium by changing the power level from the erase power level to the write power level,
   wherein the second predefined time period is longer than the first predefined time period,
   wherein difference between the second predefined time period and the first predefined time period is equal to or longer than a transient response period of a waveform of the laser light, and
   wherein the level of the high frequency signal at the time of the recording is equal to or smaller than 4 mWpp when the recording medium is a DVD±RW.

2. The information recording and reproduction apparatus according to claim 1, wherein the level of the high frequency signal at the time of the recording is smaller than the level of the high frequency signal at the time of the reproduction.

3. The information recording and reproduction apparatus according to claim 1, wherein the level of the high frequency signal at the time of the reproduction is equal to or larger than 5 mWpp when the recording medium is a DVD.

4. An information recording and reproduction method which records and reproduces information by irradiating a laser light onto a recording medium, comprising:
- a driving signal generating process which generates a laser driving signal having a write power level corresponding to performing recording an information on the recording medium, an erase power level corresponding to performing erasing a recording mark recorded onto the recording medium, or, a read power level corresponding to neither recording nor erasing on the recording medium;
- a high frequency superimposing process which superimposes a high frequency signal on the laser driving signal; and
- a control process which drives a light source by the laser driving signal on which the high frequency signal is superimposed to perform recording and reproduction,
- wherein a level of the high frequency signal at a time of recording is different from the level of the high frequency signal at a time of reproduction,
- wherein the control process detects a recording information based on an inputted information, wherein the high frequency superimposing process changes the level of the high frequency signal at the timing of a first predefined time period after detecting the recording information, wherein the control process transits from a reproduction state to a recording state by changing the power level from the read power level to the erase power level at the timing of a second predefined time period after detecting the recording information, and records the recording information onto the recording medium by changing the power level from the erase power level to the write power level,
- wherein the second predefined time period is longer than the first predefined time period,
- wherein difference between the second predefined time period and the first predefined time period is equal to or longer than a transient response period of a waveform of the laser light, and
- wherein the level of the high frequency signal at the time of the recording is equal to or smaller than 4 mWpp when the recording medium is a DVD±RW.

5. A computer-readable medium with a computer program recorded in a non-transitory state thereon executed in an information recording and reproduction apparatus to record and reproduce information by irradiating a laser light onto a recording medium, making the information recording and reproduction apparatus function as:
- a driving signal generating unit which generates a laser driving signal having a write power level corresponding to performing recording an information on the recording medium, an erase power level corresponding to performing erasing a recording mark recorded onto the recording medium, or, a read power level corresponding to neither recording nor erasing on the recording medium;
- a high frequency superimposing unit which superimposes a high frequency signal on the laser driving signal; and
- a control unit which drives a light source by the laser driving signal on which the high frequency signal is superimposed to perform recording and reproduction,
- wherein a level of the high frequency signal at a time of recording is different from the level of the high frequency signal at a time of reproduction,
- wherein the control unit detects a recording information based on an inputted information,
- wherein the high frequency superimposing unit changes the level of the high frequency signal at the timing of a first predefined time period after detecting the recording information,
- wherein the control unit transits from a reproduction state to a recording state by changing the power level from the read power level to the erase power level at the timing of a second predefined time period after detecting the recording information, and records the recording information onto the recording medium by changing the power level from the erase power level to the write power level,
- wherein the second predefined time period is longer than the first predefined time period,
- wherein difference between the second predefined time period and the first predefined time period is equal to or longer than a transient response period of a waveform of the laser light, and
- wherein the level of the high frequency signal at the time of the recording is equal to or smaller than 4 mWpp when the recording medium is a DVD±RW.

* * * * *